United States Patent [19]
Lund

[11] Patent Number: 6,126,229
[45] Date of Patent: Oct. 3, 2000

[54] CAB FAIRING, MOTOR VEHICLE INCLUDING A CAB FAIRING, AND METHOD FOR INSTALLING A CAB FAIRING ON A MOTOR VEHICLE

[75] Inventor: David M. Lund, Detroit Lakes, Minn.

[73] Assignee: Lund Industries, Incorporated, Anoka, Minn.

[21] Appl. No.: 09/182,139

[22] Filed: Oct. 29, 1998

[51] Int. Cl.[7] .................................................. B60J 1/00
[52] U.S. Cl. .................................. 296/180.1; 296/180.2; 296/95.1
[58] Field of Search .............................. 296/180.1, 180.2, 296/95.1; D12/190

[56] References Cited

U.S. PATENT DOCUMENTS

| D. 164,257 | 8/1951 | O'brien ................................. D12/190 |
| D. 221,299 | 7/1971 | Burland ................................ D12/190 |
| D. 281,487 | 11/1985 | Chapman . |
| D. 286,143 | 10/1986 | Lund . |
| D. 294,242 | 2/1988 | O'Neill . |
| D. 295,084 | 4/1988 | Weber . |
| D. 305,017 | 12/1989 | Lund . |
| D. 305,633 | 1/1990 | Kingsley ............................... D12/190 |
| D. 306,848 | 3/1990 | Macor . |
| D. 316,391 | 4/1991 | Lund . |
| D. 332,072 | 12/1992 | Shirlin et al. ......................... D12/190 |
| D. 333,118 | 2/1993 | Staufer ................................. D12/190 |
| 1,275,400 | 8/1918 | Crowell . |
| 3,731,969 | 5/1973 | Bildfell ................................. 296/180.2 |
| 4,081,195 | 3/1978 | Gotz .................................... 296/180.1 |
| 4,159,843 | 7/1979 | Crossman . |
| 4,318,565 | 3/1982 | Lay . |
| 4,707,014 | 11/1987 | Rich . |
| 4,819,132 | 4/1989 | Hwan et al. ......................... 296/180.1 |
| 5,018,779 | 5/1991 | Lund . |
| 5,060,340 | 10/1991 | Grassini ............................... 296/180.1 |
| 5,076,636 | 12/1991 | Buck et al. .......................... 296/180.1 |

*Primary Examiner*—Joseph D. Pape
*Assistant Examiner*—Kiran Patel
*Attorney, Agent, or Firm*—Merchant & Gould P.C.

[57] ABSTRACT

A cab fairing for attachment to a pickup truck cab is provided. The cab fairing includes a left side panel, a right side panel, and a wing panel. The left and right side panels include a forward region having a forward edge for adhesive attachment to a pick up truck cab sidewalls provided beyond the pickup truck driver and passenger doors. The left and right side panels can additionally be adhesively attached to the pick up truck roof. The wing panel includes a forward region having a forward edge for adhesive attachment to the roof of the pickup truck cab. Preferably, the panels include a rearward region having a flange edge for adhesively attaching to the rear side of the pickup truck cab. A pickup truck having a cab fairing and a method for installing a cab fairing to a pickup truck cab are provided.

16 Claims, 7 Drawing Sheets

CAB FAIRING, MOTOR VEHICLE INCLUDING A CAB FAIRING, AND METHOD FOR INSTALLING A CAB FAIRING ON A MOTOR VEHICLE

FIELD OF THE INVENTION

The invention relates to a cab fairing, a motor vehicle including a cab fairing, and a method for installing a cab fairing on a motor vehicle. In particular, the cab fairing can be adhesively attached to the cab of a pickup truck.

BACKGROUND OF THE INVENTION

The cab of a conventional pickup truck typically has a generally rectangular appearance and a depth sufficient to accommodate the comfortable seating of passengers. In order to maximize the cargo capacity in the pickup truck bed or box, the cab typically terminates in a near vertical wall immediately behind the passenger seats. Many pickup truck designs can be referred to as having an "extended cab." This generally means the cab is extended to provide a space behind the passenger seats. In certain pickup truck designs, the space is large enough to include an additional passenger seating arrangement and a door. The generally rectangular cab structure projecting abruptly into the air stream tends to create a high drag force on the truck as it travels along the road.

Numerous pickup truck cab fairings have been proposed to decrease drag effect and direct air flow over the cab. By decreasing drag effect, cab fairings can also improve vehicle mileage. These devices also can reduce air turbulence within the truck bed and protect cargo carried within. They have the additional advantages of reducing the glare from the sun into the cab for the benefit of the passengers, and shielding cargo within the bed from the sun. Cab fairings also add a decorative look to trucks, extending the cab lines of the truck and making trucks look sportier. Cab fairings provide a surface for mounting of lights, antennas or horns. Cab fairings are seldom included in pickup trucks as they leave the factory, and so they must be retrofitted to existing vehicles.

Exemplary cab fairings are described in U.S. Pat. No. 5,018,779 to Lund, and U.S. Design Patent Nos. 281,487 to Chapman, 286,143 to Lund, 294,242 to O'Neill, and 295,084 to Weber.

SUMMARY OF THE INVENTION

A cab fairing for attachment to a pickup truck cab is provided by the invention. The cab fairing includes a left side panel, a right side panel, and a wing panel extending between the left side panel and the right side panel. The left side panel and the right side panel have a forward region and a rearward region. The forward region includes a forward edge having an adhesive for attachment to a pickup truck cab right side. The rearward region is constructed for extending beyond the rearward edge of a pickup truck cab. The wing panel includes a forward region and a rearward region. The forward region includes a forward edge having an adhesive for attachment to a roof of a pickup truck cab. Preferably, the rearward regions of the left side panel, the right side panel, and the wing panel include a flange edge having an adhesive for attachment to a rear edge of a pickup truck cab. The adhesive is preferably in the form of double sided adhesive tape.

By providing a cab fairing which can be adhesively attached to a pickup truck cab along the forward edge of the cab fairing and the rearward flange edge of the cab fairing, it is possible to provide a cantilevered structure. Accordingly, the tail of the cab fairing extends beyond the rearward edge of the pickup truck cab and is rigidly held in place by the cantilevered structure.

The cab fairing can include door covers for attachment to the rear doors of a pick up truck cab. Preferably, the door covers are provided for adhesive attachment to the doors. Although the invention is described in the context of adhesively attaching the cab fairing to a pickup truck cab, it should be understood that the cab fairing can be additionally secured to the pickup truck cab by conventional fasteners including screws and/or bolts.

A motor vehicle comprising a pickup truck having a cab and a cargo bed, and a cab fairing adhesively attached to the cab is provided by the invention. Accordingly, at least the forward edge of the left side panel, the right side panel, and the wing panel are adhesively attached to the cab sides and roof. Preferably, the flange edge of the right side panel, left side panel, and wing panel of the cab fairing is adhesively attached to the rear edge of the pickup truck cab. Door covers can be adhesively attached to the doors of the pickup truck.

A method for installing a cab fairing on a pickup truck cab is provided by the invention. The method includes a step of providing a pickup truck having a cab including a roof, side walls, and a rear edge wall. The method additionally includes a step of adhesively attaching a cab fairing to the pickup truck cab.

DETAILED DESCRIPTION OF THE PREFERRED EMBODIMENT

Referring to FIGS. 1–9, a cab fairing according to the present invention is indicated at reference numeral 10. The cab fairing 10 can be referred as an adhesively mounted cab fairing because adhesive can be used for attaching the cab fairing to the cab 12 of a pickup truck 14. It is an advantage of the present invention that the cab fairing 10 can be attached without the use of conventional mechanical fasteners, such as screws or bolt type fasteners, which place holes in the cab of a pickup truck. It should be appreciated that while the cab fairing 10 can be adhered to the cab 12 of a pickup truck 14, it can additionally be secured in place using conventional mechanical fasteners, such as screw and/or bolt type fasteners, although it is preferred not to use fasteners which create holes in the cab 12. If fasteners which place holes in the vehicle are used, it is desirable to place them at locations which are fairly inconspicuous. In addition, while the invention is described in the context of a pickup truck having a standard size cab, the invention is applicable to extended cab pickup truck vehicles.

It should be understood that a "cab fairing" identifies a pickup truck accessory which attaches to the cab a pickup truck. In contrast, a "cab spoiler" describes a pickup truck accessory which attaches to the box of a pickup truck. A cab spoiler generally does not attach to the cab. The cab fairing 10 attaches to the cab 12 but does not attach to the pickup truck bed sidewalls 13. This allows the box to flex or move independently of the cab. Of course, there can be some type of connection between the cab fairing 10 and the sidewalls 13 as long as the connection does not provide sufficient stress to cause the cab fairing 10 to detach from the cab 12. Furthermore, the cab fairing 10 allows the placement of a tonneau cover between the sidewalls 13.

The cab fairing 10 includes at least three components. These components include a driver or left side panel 16, a passenger or right side panel 18, and a wing panel 20 which extends between the left side panel 16 and the right side panel 18. It should be appreciated that while the preferred embodiment of the invention is described where each of these panels is provided as a separate structure, the invention includes the embodiment where the panels are provided as a single structure. That is, the panels are available as a single, continuous structure. It is an advantage of the invention that by separating the left side panel 16, the right side panel 18, and the wing panel 20 into separate pieces, the cab fairing 10 can be placed in a box and shipped more conveniently than if provided as a single structure.

The left and right side panels 16 and 18 include a forward region 22 and a rearward region 24. In general, the rearward region 24 extends beyond or rearward of the cab 12. The farthest rearward portion of the rearward region 24 can be referred to as the tail 21. The forward region 22 includes an exterior surface 26 and an interior surface 28.

The exterior surface 26 can be painted so that the cab fairing 10 matches the color of the pickup truck 14. The interior surface 28 remains hidden from view when the cab fairing 10 is attached to the cab 12. Accordingly, the left and right side panels 16 and 18 extend from a forward edge 30 provided in the forward region 22 to a flange edge 32 provided in the rearward region 24. Accordingly, the rearward region 24 extends beyond the cab 12 and terminates at the flange edge 32 which fastens to the rearward edge 34 of the cab 12.

The wing panel 20 includes a forward region 40, a rearward region 42, an exterior surface 44, and an interior surface 46. The wing panel 20 extends from the forward edge 48 and terminates in a flange edge 50. In general, the wing panel 20 preferably has a structure which allows it to follow the lines established by the left and right side panels 16 and 18. The leading edge 51 of the wing panel generally extends continuously from the left side panel 16, the wing panel 20, and the right side panel 18. The wing panel 20 preferably includes a break light 49 for electrical connection to the motor vehicle to provide a brake light effect when the motor vehicle is braking.

The left and right side panels 16 and 18 are preferably adhesively attached to the sides (not shown) of the cab 12 and the roof 52. The adhesive is preferably provided along the forward edge 30 on the interior surface 28. The forward edge 30 is preferably provided trailing the doors 55 which allow access to the cab 12. In addition, the left and right side panels 16 and 18 include a projection 54 which extends forward of the door rear edge 56. While the preferred embodiment of the invention includes the side panels having projection 54, it should be appreciated that it is not a requirement of the invention. Accordingly, the left and right side panels 16 and 18 can be constructed so that they do not include the projection 54. It should be appreciated, however, that the projection 54 provides additional adhesive surface for attaching the cab fairing 10 to the cab 12. The wing panel 20 is adhesively attached along the forward edge 48.

It should be understood that any type of adhesive fastening system can be used for attaching the cab fairing 10 to the cab 12 as long as it sufficiently holds the cab fairing 10 in place. It is preferred to use double sided adhesive tape 58 for adhesive attachment of the cab fairing 10 to the cab 12. The adhesive tape is preferably provided along the forward edges 30 and 48. Preferred double sided adhesive tape is available from Minnesota Mining and Manufacturing Company of St. Paul, Minn. Preferably, the double sided adhesive tape has a width of between about one-half inch and one inch. Preferably, the width of the double sided adhesive tape is about three-quarter inch. In order to provide additional adhesion of the cab fairing 10 to the cab 12, it is preferable to adhesively attach the flange edge 32 of the left and right side panels 16 and 18, and the flange edge 50 of the wing panel 20 to the rearward surface 34 of the cab 12. It should be understood that the flange edges 32 and 50 are provided so that they can adhesively mount to the rearward or trailing surface 34 of the cab 12. That is, they attach to the cab portion just beyond the rear window 59. Accordingly, the flange edges 32 and 50 and preferably almost abut up to the trim 61 around the window 59. The flange edges 32 and 50 are preferably adhered using double sided adhesive tape.

The bottom edge 63 of the left and right side panels 16 and 18 preferably covers the pickup truck sidewalls 13, but remain unattached. It is preferred not to adhesively attach the bottom edge 63 to the pickup truck bed sidewalls 13 so as not to create stress on the attachment between the cab fairing 10 and the cab 12 resulting from the movement of the pickup truck bed relative to the cab. Optionally, the bottom edge can be attached to the pickup truck bed sidewalls 13.

Figures 7, 8, 9:
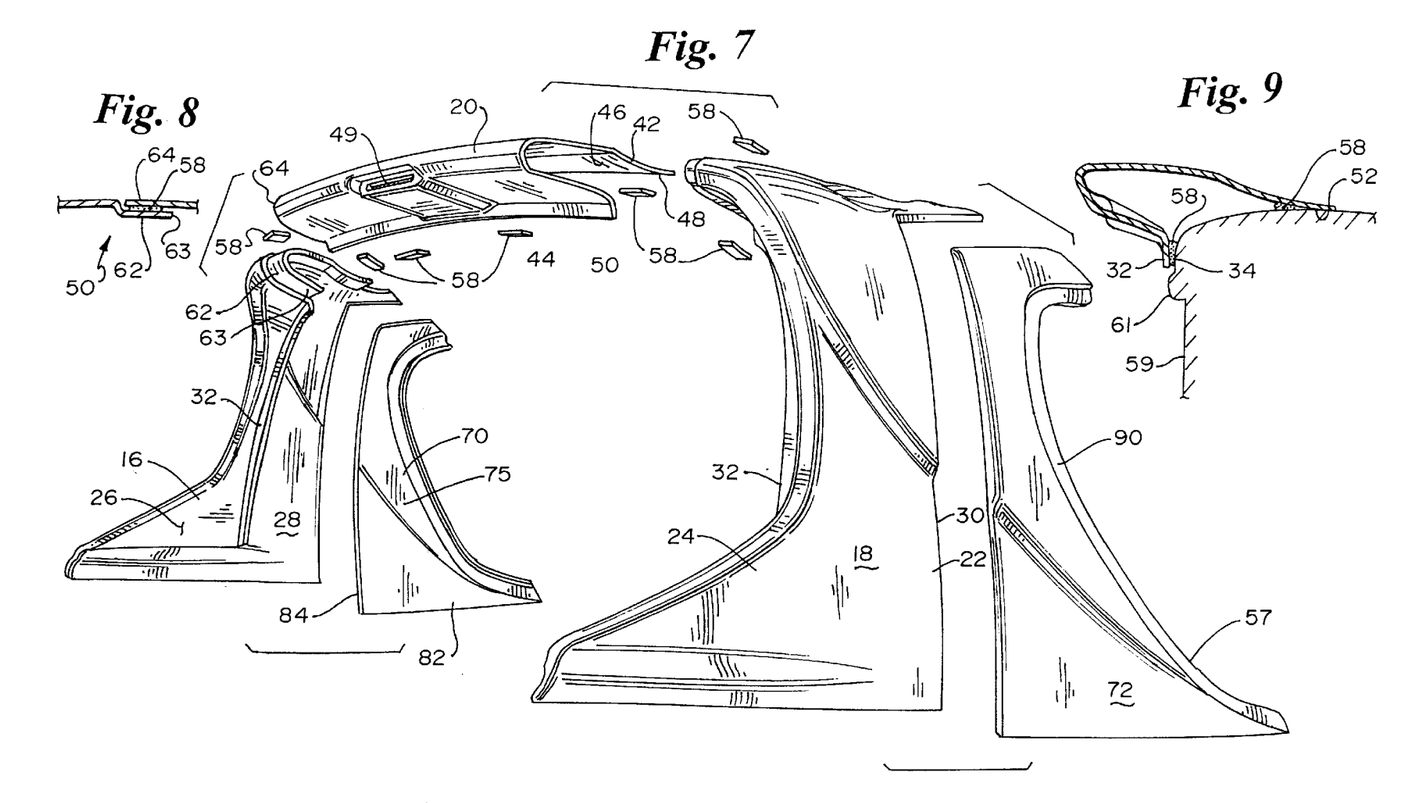
FIG. 7 is an exploded view of the cab fairing shown in FIG. 1.
FIG. 8 is a sectional view taken along lines 8—8 of FIG. 3.
FIG. 9 is a sectional view taken along lines 9—9 of FIG. 1.

While the preferred embodiment of the cab fairing 10 is described where the left side panel 16, right side panel 18, and wing panel 20 are separate components, they are provided with an interlocking structure 60 which allows them to become fastened together. Preferably, the left side panel 16 and the right side panel 18 include a projection 62 which fits within the left end 64 and right end 66 of the wing panel 20. The projection 62 can be adhered to the left end 64 and the right end 66. Preferably, the projection 62 is adhered to the left end 64 and the right end 66 of the wing panel 20 using double sided adhesive tape 58. Although the adhesive tape 58 is shown in FIG. 7 as relatively small and rectangular pieces, it should be appreciated that this is for convenience. The tape 58 is preferably continuous about the surface 63 of the projection 62. When the left side panel 16, the right side panel 18, and the wing panel 20 are assembled, seams 67 are provided. In the case where the side panels and the wing panel are provided of a single, continuous structure, there will be no seam.

The cab fairing 10 preferably includes a left side door cover 70 and a right side door cover 72. It should be appreciated that the left side door cover 70 and the right side cover 72 are provided for aesthetically blending the cab fairing 10 with the pickup truck 14 to provide a more custom look. The left side door cover 70 and the right side door cover 72 do not assist in securing the left side panel 16, right side panel 18, and wing panel 20 to the cab 12. In fact, if the cab fairing 12 is constructed without the projection 54, it may be desirable to forego the use of the door covers 70 and 72. Alternatively, the door covers 70 and 72 can simply be omitted whether or not the cab fairing 10 includes the projection 54. The door covers 70 and 72 are desired components of the cab fairing 10, but they are not required components. The left side door cover 70 and the right side door cover 72 include an exterior surface 74 which can be finished to provide a surface which is similar to the finished surface of the pickup truck 14.

Figure 1:
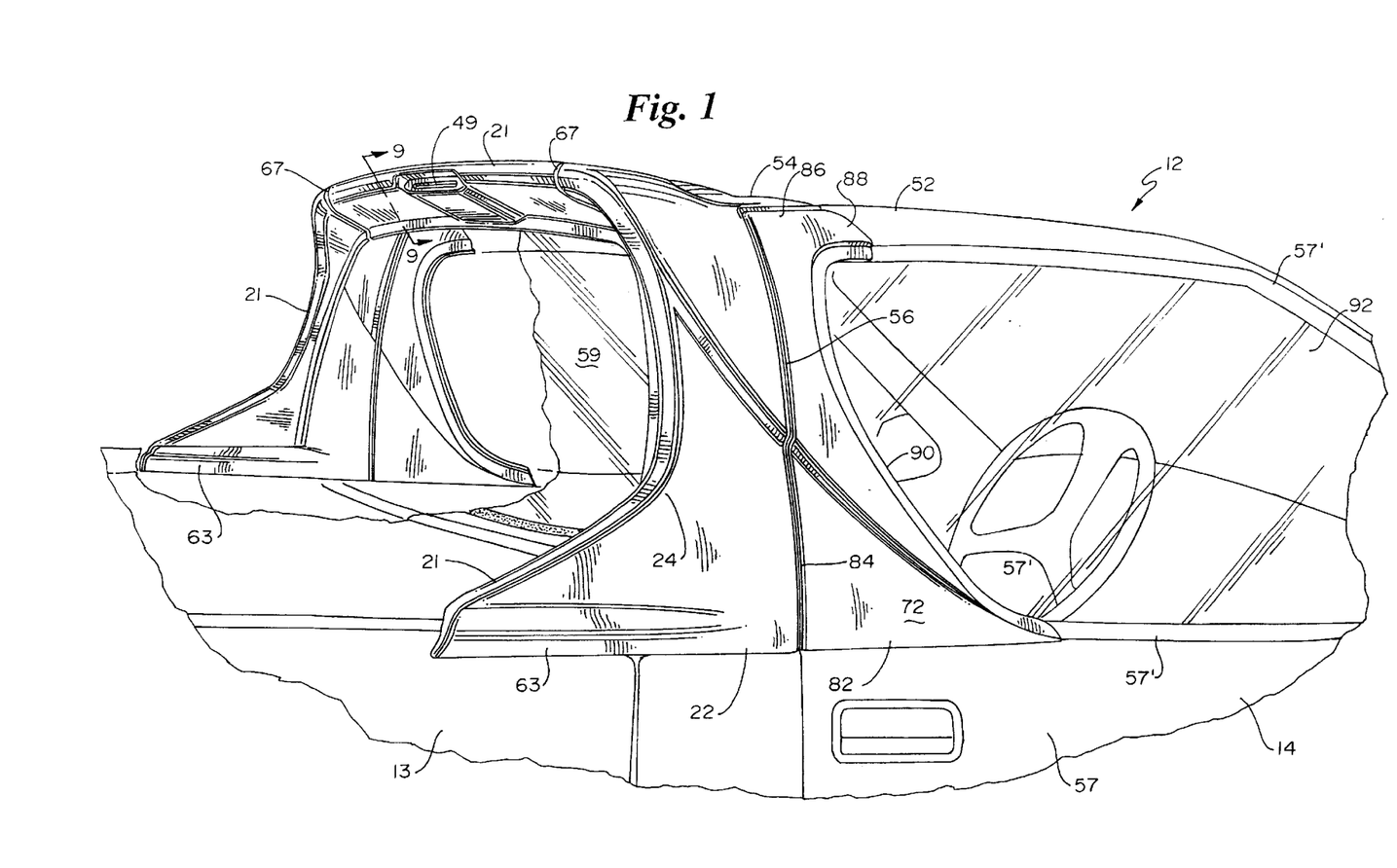
FIG. 1 is a partial break away, perspective view of a cab fairing constructed according to the principles of the present invention and provided on a pickup truck.
Figure 2:
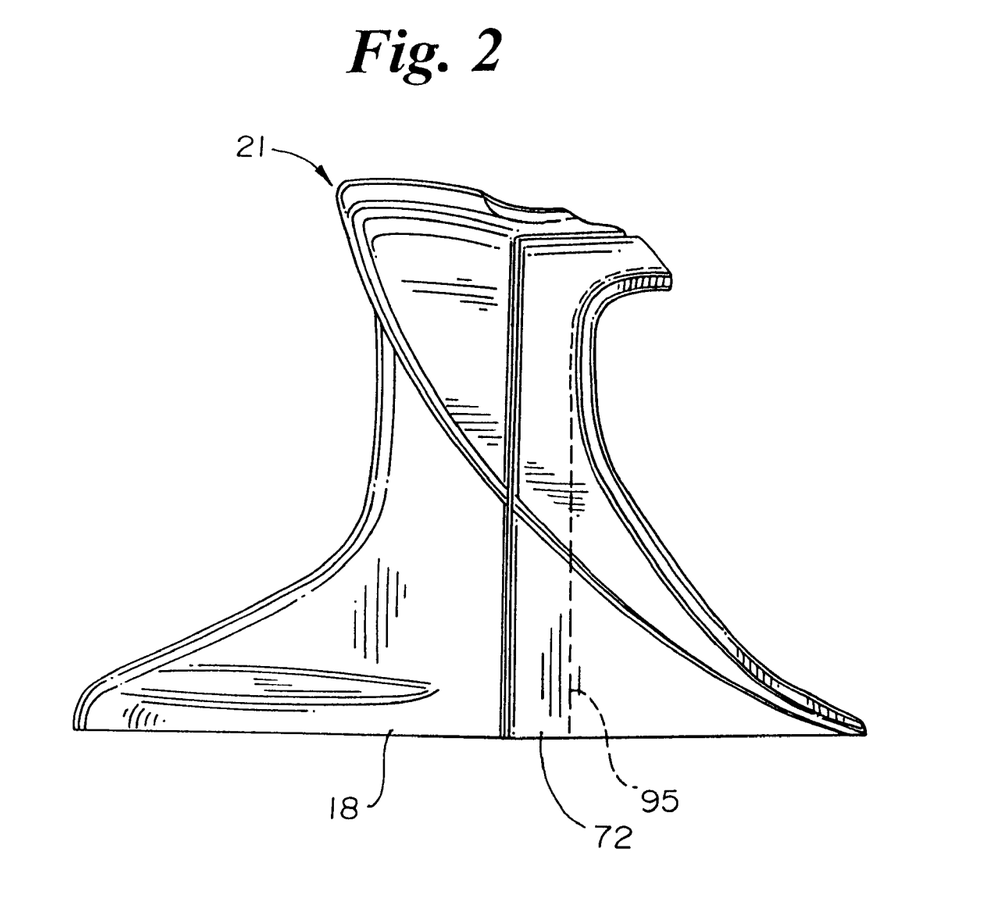
FIG. 2 is a side elevation view of the cab fairing shown in FIG. 1.
Figure 3:
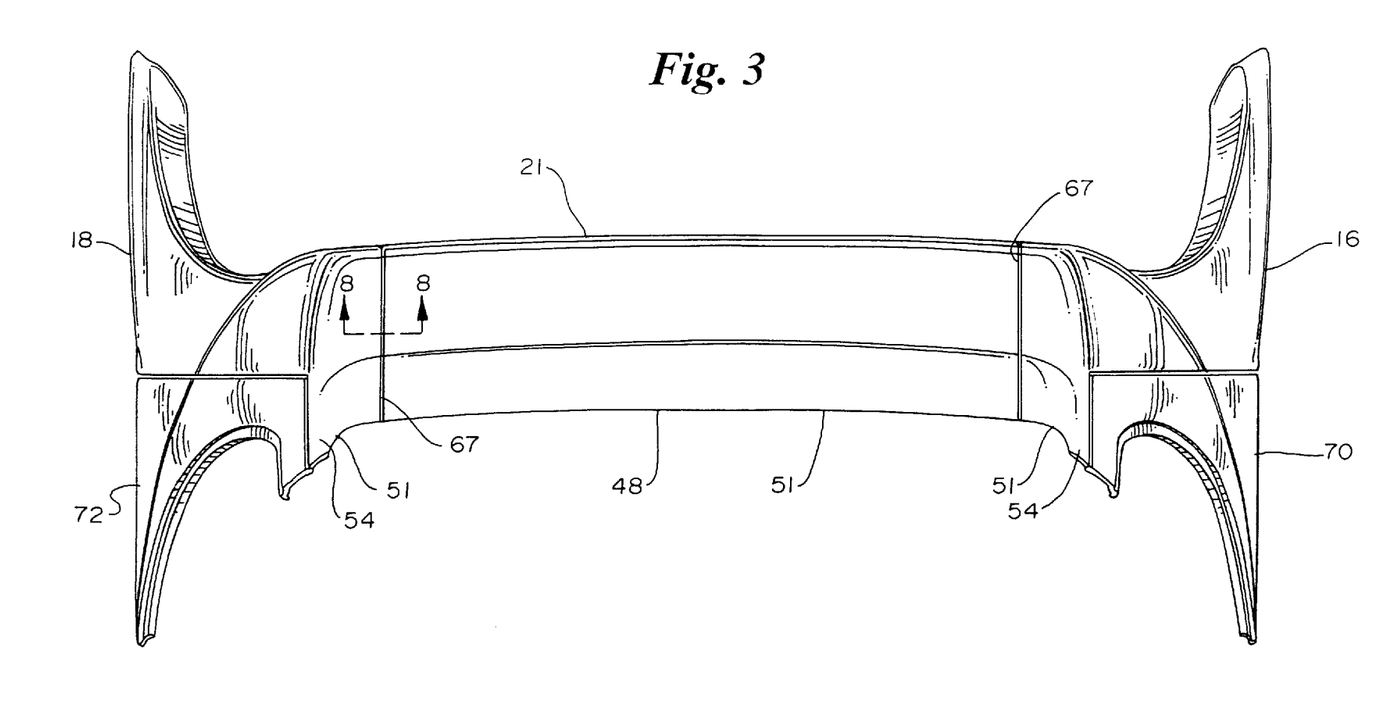
FIG. 3 is a top plan view of the cab fairing shown in FIG. 1.
Figure 4:
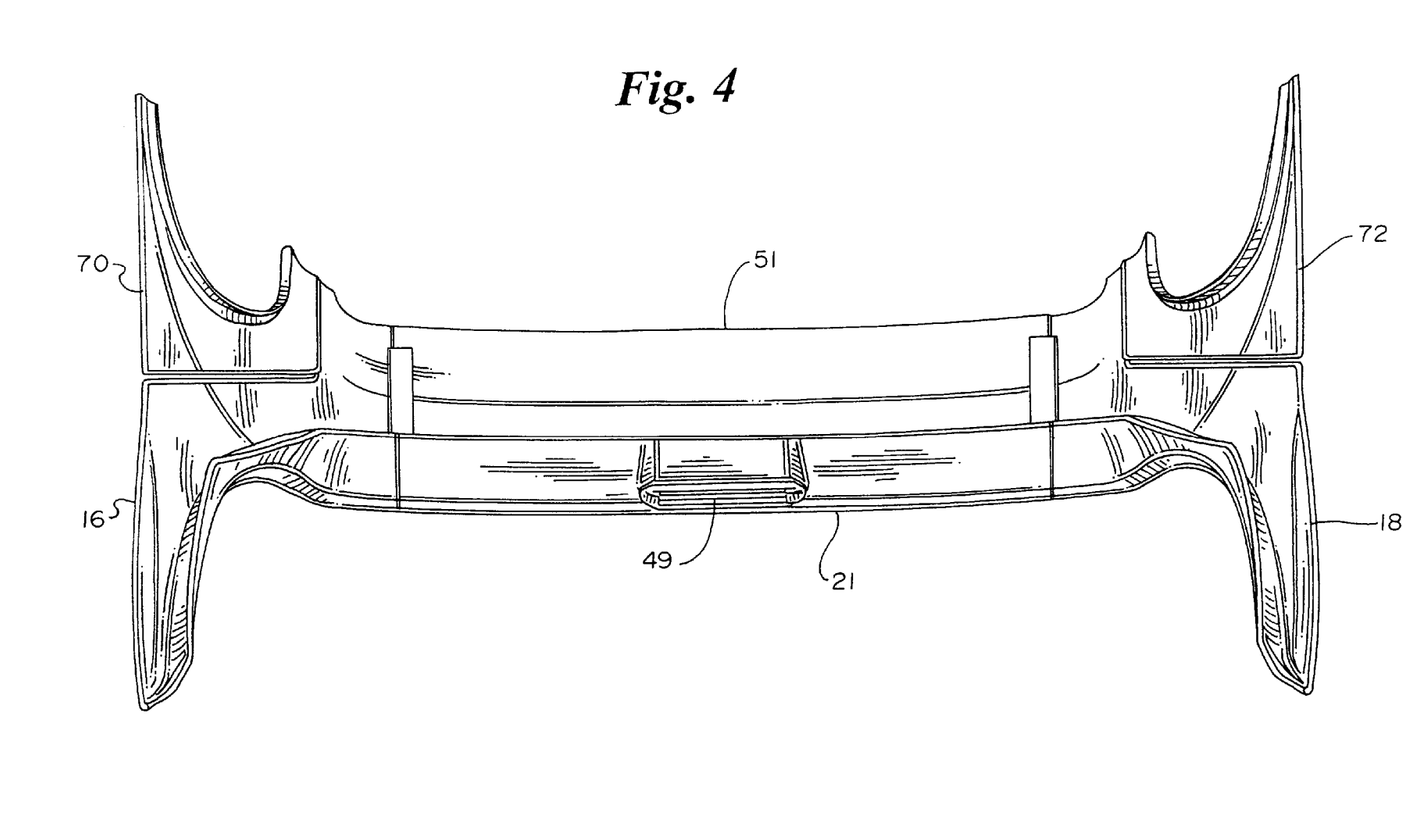
FIG. 4 is a bottom plan view of the cab fairing shown in FIG. 1.
Figure 5:
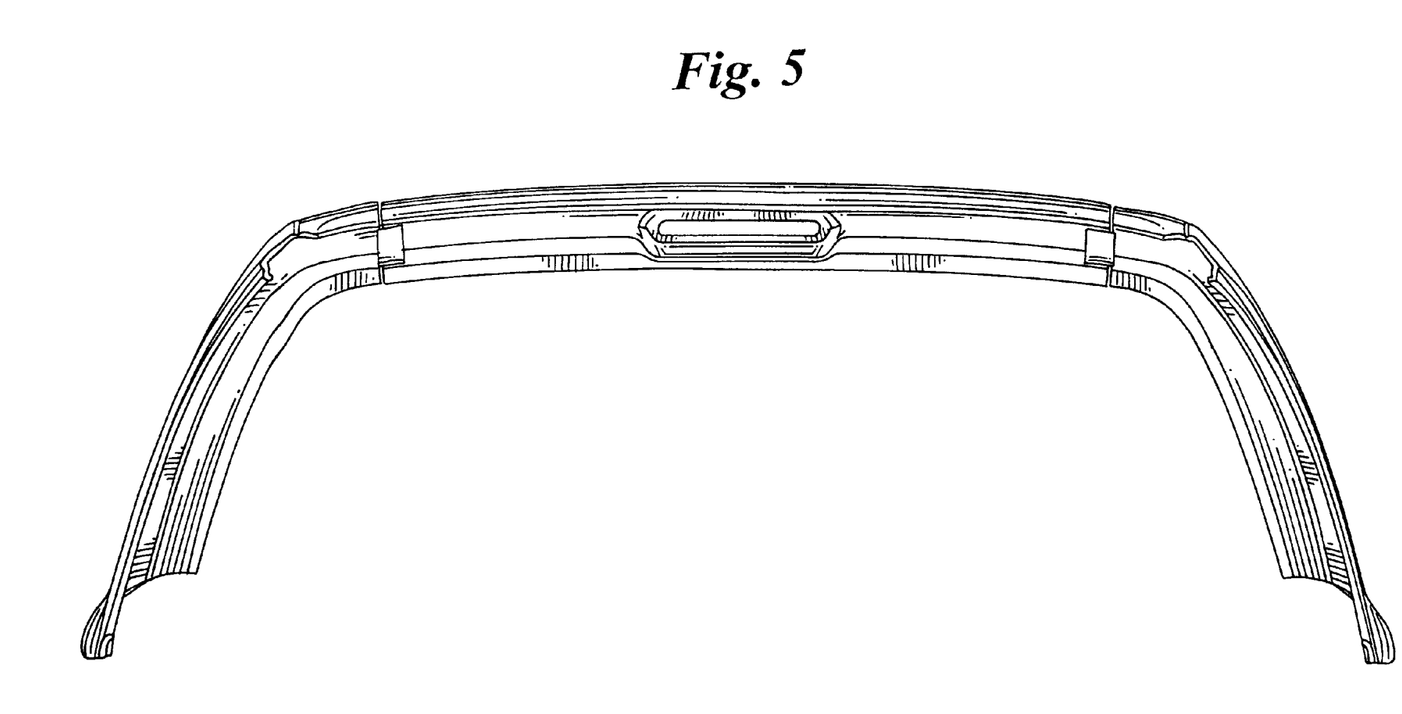
FIG. 5 is a rear elevation view of the cab fairing shown in FIG. 1.
Figure 6:
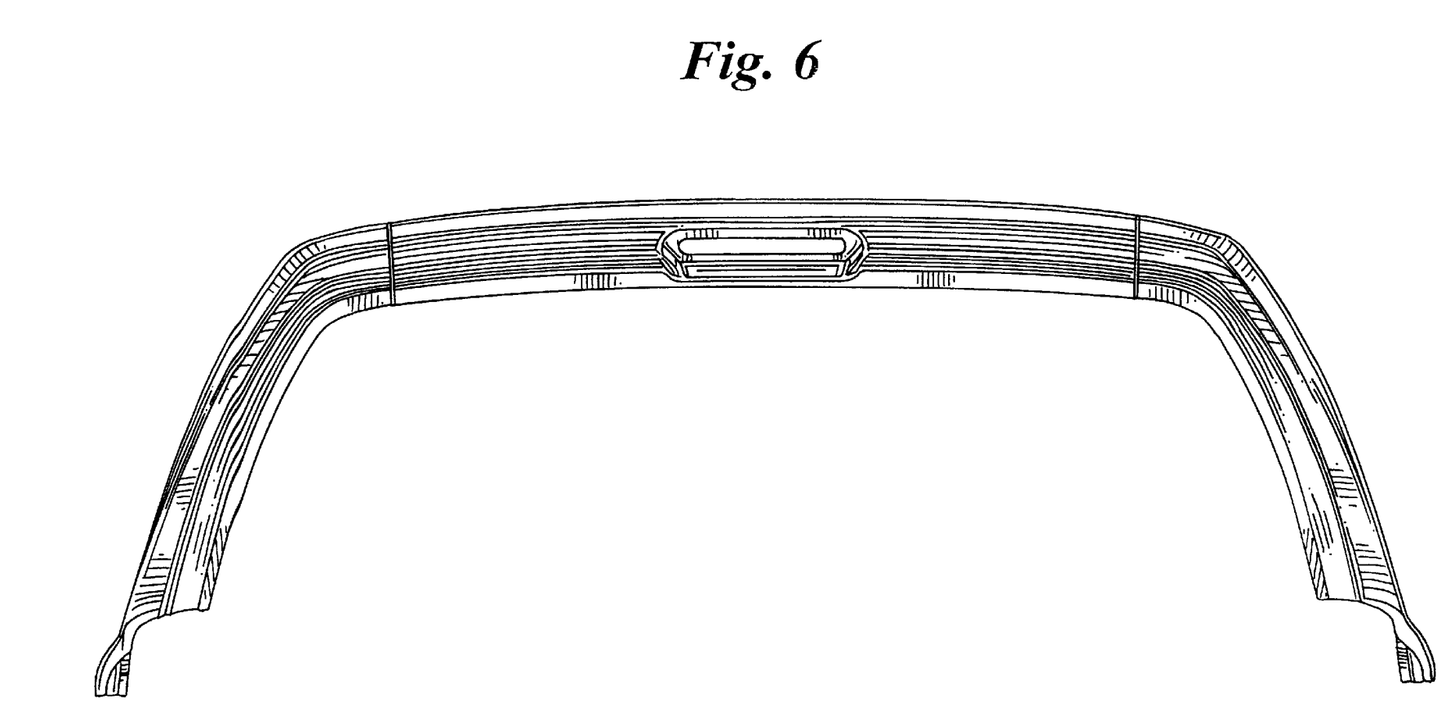
FIG. 6 is a front elevation view of the cab fairing shown in FIG. 1.

The door covers 70 and 72 are preferably attached to the door along the bottom edge 82, the rear edge 84, the top edge 86 and the top leading edge 88. That is, double sided adhesive tape can be used for adhesively attaching the door covers along the perimeter of the doors. Preferably, the attachment is by an adhesive which attaches the interior surface 75 to the door 55. The door covers preferably include an edge 57 which can be painted so that it matches the molding 57' on the door. In most circumstances, this means that the edge 57 will be painted black. The forward edge 90 of the door covers 70 and 72 generally covers the door window 92 and does not attach to the window 92. This allows one to roll the window 92 up or down independent of the door cover. In an alternative embodiment, the forward edge 90 of the door cover may be adhered to the window. For example, in certain extended cab pickup trucks, the rear side windows open out. Accordingly, the door cover can be split along the line provided by the window edge so that the window will continue to open and close. FIG. 2 includes a dotted line 95 which indicates a split in the door cover 72 can be provided. When the door cover is split, it is generally desirable to provide adhesive tape on both sides of the split to maintain a secure attachment.

An advantage of the cab fairing 10 is that it can be removed without harming the surface of the motor vehicle. Adhesive softeners or removers are available for removing the adhesive residue left by the adhesive tape 58. Furthermore, it has been found that the adhesive attachment between the forward edge and the rearward flange of the cab fairing creates a cantilevered effect which increases the strength of the cab fairing. In particular, the trailing portion or tail 21 of the cab fairing remains strongly attached to the cab 12.

The material which can be used to prepare the side panels, wing panel, and door covers include any material which would sufficiently function as a cab fairing. In general, it is desirable for the material to adhere to the cab and resist ultraviolet light degradation. A preferred material which can be used is ABS Plastic. It should be appreciated, however, that fiber glass or other engineering plastics can be used.

Those skilled in the art will undoubtedly appreciate the various modifications and additions that may be made to the apparatus of the present invention without departing from the central features thereof, which are intended to be defined and secured by the appended claims.

I claim:

1. A cab fairing for attachment to a pickup truck cab, comprising:

a left side panel having a forward region and a rearward region, said forward region including a forward edge having an adhesive for attachment to a pickup truck cab left side along a surface of the pickup truck cab trailing a left side door of the pickup truck cab, and said rearward region constructed for extending rearward of the pickup truck cab;

a right side panel having a forward region and a rearward region, said forward region including a forward edge having an adhesive for attachment to a pickup truck cab right side along a surface of the pickup truck cab trailing a right side door of the pickup truck cab, said rearward region constructed for extending rearward of the pickup truck cab; and a wing panel extending between said left side panel and said right side panel and including a forward region and a rearward region, said forward region including a forward edge having length extending between said left side panel and said right side panel and including an adhesive for adhesive attachment along the length of the forward edge to a roof of the pickup truck cab.

2. A cab fairing according to claim 1, wherein the rearward region of said left side panel includes a flange having an adhesive for attachment to a rear edge of the pickup truck cab.

3. A cab fairing according to claim 1, wherein the rearward region of said right side panel includes a flange having an adhesive for attachment to a rear edge of the pickup truck cab.

4. A cab fairing according to claim 1, wherein the rearward region of said wing panel includes a flange including an adhesive for attachment to a rear edge of the pickup truck cab.

5. A cab fairing according to claim 1, wherein said wing panel includes a left end and a right end, the left end provided for attachment to said left side panel, and the right side end being provided for attachment to said right side panel.

6. A cab fairing according to claim 5, wherein the right end of said wing panel is adhesively attached to said right side panel, and the left end of said wing panel is adhesively attached to said left side panel.

7. A cab fairing according to claim 1, further comprising a left side door cover and a right side door cover, wherein the left side door cover and the right side door cover includes an adhesive.

8. A cab fairing according to claim 7, wherein said left side door cover and said right side door cover are constructed and arranged for adhesively attaching to a pickup truck cab door but not to a pickup truck cab door window.

9. A cab fairing according to claim 1, wherein the adhesive provided on the forward edge of the wing panel comprises double sided adhesive tape.

10. A motor vehicle comprising a pickup truck having a cab and a cargo bed, and a cab fairing adhesively attached to said cab, the cab having a roof, a left side, a right side, a left side door, and a right side door, wherein said cab fairing comprises:

a left side panel having a forward region and a rearward region, said forward region including a forward edge adhesively attached to the left side of the pickup truck cab along a surface trailing the left side door of the pickup truck cab, said rearward region extending rearward of the pickup truck cab;

a right side panel having a forward region and a rearward region, said forward region including a forward edge adhesively attached to the right side of the pickup truck cab along a surface trailing the right side door of the pickup truck cab, said rearward region extending rearward of the pickup truck cab; and a wing panel extending between the left side panel and the right side panel and including a forward region and a rearward region, said forward region including a forward edge extending between the left side panel and the right side panel and adhesively attached to the roof of the pickup truck cab.

11. A motor vehicle according to claim 10, wherein said wing panel includes a left end and a right end, the left end being adhesively attached to said left side panel, and the right end being adhesively attached to the right side panel.

12. A motor vehicle according to claim 10, wherein the cab includes a rear edge, and the rearward region of said left side panel includes a flange adhesively attached to the rear edge of the cab, the rearward region of said right side panel includes a flange adhesively attached to the rear edge of the cab, and the rearward region of said wing panel includes a flange adhesively attached to the rear edge of the cab.

13. A motor vehicle according to claim 12, wherein the rearward regions of the left side panel, the right side panel, and the wing panel include a tail which is cantilevered in place by the adhesively attached forward edge and flange.

14. A method for installing a cab fairing on a pickup truck cab, the method comprising steps of:
   (a) providing a pickup truck having a cab comprising a roof, a left side, a right side, a left side door, and right side door, and rear edge wall;
   (b) adhesively attaching a cab fairing to the cab, the cab fairing comprising:
      (i) a left side panel having a forward region and a rearward region, said forward region including a forward edge adhesively attached to the left side of the pickup truck cab along a surface trailing the left side door of the pickup truck cab, said rearward region extending rearward of the pickup truck cab;
      (ii) a right side panel having a forward region and a rearward region, said forward region including a forward edge adhesively attached to the right side of the pickup truck cab along a surface trailing the right side door of the pickup truck cab, said rearward region extending rearward of the pickup truck cab; and
      (iii) a wing panel extending between the left side panel and the right side panel and including a forward region and a rearward region, said forward region including a forward edge extending between the left side panel and the right side panel and adhesively attached to the roof of the pickup truck cab.

15. A method for installing a cab fairing on a pickup truck cab according to claim 14, wherein said step of adhesively attaching comprises adhesively attaching the forward edge of the cab fairing along the roof and sides of the pickup truck cab.

16. A method for installing a cab fairing on a pickup truck cab according to claim 14, wherein said step of adhesively attaching comprises adhesively attaching a flange provided on the rearward region of the left side panel, the right side panel, and the wing panel to the rear edge wall of the pickup truck cab.

* * * * *